US012741626B2

(12) United States Patent
Ye et al.

(10) Patent No.: US 12,741,626 B2
(45) Date of Patent: Sep. 22, 2026

(54) BUS CURRENT CONTROL METHOD, DEVICE, SYSTEM, AND STORAGE MEDIUM

(71) Applicants: ZHEJIANG GEELY HOLDING GROUP CO., LTD., Hangzhou (CN); GEELY AUTOMOBILE RESEARCH INSTITUTE (NINGBO) CO., LTD, Ningbo (CN)

(72) Inventors: Xianjun Ye, Hangzhou (CN); Ou Ruan, Hangzhou (CN)

(73) Assignees: ZHEJIANG GEELY HOLDING GROUP CO., LTD., Hangzhou (CN); GEELY AUTOMOBILE RESEARCH INSTITUTE (NINGBO) CO., LTD, Ningbo (CN)

( * ) Notice: Subject to any disclaimer, the term of this patent is extended or adjusted under 35 U.S.C. 154(b) by 401 days.

(21) Appl. No.: 18/484,628

(22) Filed: Oct. 11, 2023

(65) Prior Publication Data

US 2024/0034297 A1 Feb. 1, 2024

Related U.S. Application Data

(63) Continuation of application No. PCT/CN2022/088594, filed on Apr. 22, 2022.

(30) Foreign Application Priority Data

Jul. 2, 2021 (CN) ......................... 202110749811.1

(51) Int. Cl.
*H02P 6/00* (2016.01)
*B60W 10/08* (2006.01)
(Continued)

(52) U.S. Cl.
CPC .......... *B60W 10/08* (2013.01); *B60W 30/188* (2013.01); *H02P 21/30* (2016.02); *B60W 2710/085* (2013.01)

(58) Field of Classification Search
CPC .......... H02P 21/30; H02P 6/28; H02P 29/027; H02P 23/14; H02P 27/06; H02P 24/032
See application file for complete search history.

(56) References Cited

U.S. PATENT DOCUMENTS

2008/0116842 A1 5/2008 Cheng et al.
2014/0077737 A1 3/2014 Zhang et al.
2018/0091081 A1 3/2018 Suzuki et al.

FOREIGN PATENT DOCUMENTS

CN 111746345 A 10/2020
CN 111959279 A 11/2020
(Continued)

OTHER PUBLICATIONS

Extended European Search Report issued in counterpart European Patent Application No. 22831379.7, dated Sep. 24, 2024.
(Continued)

*Primary Examiner* — Karen Masih
(74) *Attorney, Agent, or Firm* — Westbridge IP LLC

(57) ABSTRACT

Disclosed are a bus current control method, a device, a system and a storage medium. The method includes: obtaining a data set including a motor speed corresponding to a current time point, an actual current and an actual torque; determining a limit current at the current time point according to the motor speed; in response to the limit current being less than the actual current, determining a deviation value at the current time point according to the limit current and the actual current; determining a target requested torque based on the deviation value and the actual torque; and determining the bus current according to the target requested torque.

6 Claims, 11 Drawing Sheets

(51) Int. Cl.
*B60W 30/188* (2012.01)
*H02P 21/30* (2016.01)

(56) References Cited

FOREIGN PATENT DOCUMENTS

| | | | | |
|---|---|---|---|---|
| CN | 112829605 A | | 5/2021 | |
| CN | 113472269 A | | 10/2021 | |
| CN | 113415174 B | * | 8/2024 | ............... H02H 9/02 |
| JP | 2013038947 A | | 2/2013 | |
| WO | 2016102934 A1 | | 6/2016 | |

OTHER PUBLICATIONS

Grant Notification issued in counterpart Chinese Patent Application No. 202110749811.1, dated Sep. 5, 2022.

International Search Report and Written Opinion issued in corresponding PCT Application No. PCT/CN2022/088594, dated Jun. 29, 2022.

* cited by examiner

FIG. 4

BUS CURRENT CONTROL METHOD, DEVICE, SYSTEM, AND STORAGE MEDIUM

CROSS-REFERENCE TO RELATED APPLICATIONS

This application is a continuation application of International Application No. PCT/CN2022/088594, filed on Apr. 22, 2022, which claims priority to Chinese Patent Application No. 202110749811.1, filed on Jul. 2, 2021. The disclosures of the above-mentioned applications are incorporated herein by reference in their entireties.

TECHNICAL FIELD

The present application relates to the technical field of current control, and in particular to a bus current control method, a device, a system, and a storage medium.

BACKGROUND

In the prior art, a schematic diagram of a high-voltage power supply system of an electric vehicle is shown in FIG. 1. The direct current (DC) power of the high-voltage battery is supplied to the motor and the controller (inverter) thereof, electric compressor (electric air conditioner), electric heater, DC-DC (direct current to direct current) and other high-voltage electrical equipment through the DC bus. As the power source for vehicle motion control, the motor and its controller have a large bus current (power supply or power generation).

In order to protect the entire high-voltage power supply system, circuit protection devices, fuses and relays are designed in the system; and when the bus current overcurrent occurs, the circuit is disconnected by blowing the fuse. However, since this method is passive protection, it not only easily causes damage to vehicle parts, but also causes high-voltage safety risks in the high-voltage system, such as the excessive temperature generated by the overshoot of the DC bus current will accelerate the aging of the insulation.

SUMMARY

The main objective of the present application is to solve the technical problems of passive overcurrent protection in the related art, resulting in damage to vehicle parts and high voltage safety risks.

In order to achieve the above objective, the present application provides a bus current control method including the following steps:

- obtaining a data set including a motor speed, an actual current and an actual torque corresponding to a current time point;
- determining a limit current at the current time point according to the motor speed;
- in response to the limit current being less than the actual current, determining a deviation value at the current time point according to the limit current and the actual current;
- determining a target requested torque based on the deviation value and the actual torque; and
- determining the bus current according to the target requested torque.

In an embodiment, the determining the target requested torque based on the deviation value and the actual torque includes:

- obtaining a preset time parameter and a preset correction coefficient;
- determining a torque correction value at the current time point according to the preset time parameter, the preset correction coefficient and the deviation value;
- obtaining a vehicle requested torque at the current time point; and
- determining the target requested torque according to the torque correction value, the vehicle requested torque, and the actual torque.

In an embodiment, the preset correction coefficient includes a first preset correction coefficient, a second preset correction coefficient, a third preset correction coefficient and a fourth preset correction coefficient;

- the determining the torque correction value at the current time point according to the preset time parameter, the preset correction coefficient and the deviation value includes:
- obtaining a deviation value set including the deviation value at the current time point and the deviation value corresponding to a target time point before the current time point; the target time point is a time point corresponding to when the limit current is less than the actual current;
- determining a first correction value according to the first preset correction coefficient and the deviation value at the current time point;
- determining a second correction value based on the preset time parameter, the second preset correction coefficient, the third preset correction coefficient, and the deviation value set;
- determining a third correction value based on the fourth preset correction coefficient, the preset time parameter, the deviation value at the current time point, and a deviation value at a first historical time point; the target time point includes the first historical time point, and the first historical time point is a historical time point adjacent to the current time point; and
- determining the torque correction value at the current time point based on the first correction value, the second correction value and the third correction value.

In an embodiment, in response to an actual torque at the first historical time point being greater than a torque correction value at the first historical time point, the third preset correction coefficient is 1; or

- in response to the actual torque at the first historical time point being less than or equal to a torque correction value at the first historical time point, the third preset correction coefficient is 0.

In an embodiment, after the determining the limit current at the current time point according to the motor speed, the method further includes:

- in response to the limit current being greater than or equal to the actual current, obtaining a peak torque at the current time point and the vehicle requested torque at the current time point;
- determining the target requested torque according to the peak torque and the vehicle requested torque; and
- determining the bus current according to the target requested torque.

In an embodiment, the determining the limit current at the current time point according to the motor speed includes:

- determining a limit current reference value at the current time point according to the motor speed, the limit current reference value is less than a target current value; the target current value is a limiting current value corresponding to the bus;

determining a motor speed change rate at the current time point based on the motor speed and a motor speed at a second historical time point; the second historical time point is a historical time point adjacent to the current time point; and determining the limit current by the motor speed change rate and the limit current reference value.

In an embodiment, after the determining the limit current at the current time point according to the motor speed, the method further includes:

determining an updated limit current at the current time point based on the limit current and a preset current value;

the in response to the limit current being less than the actual current, determining the deviation value at the current time point according to the limit current and the actual current includes:

in response to the updated limit current being less than the actual current, determining the deviation value at the current time point according to the updated limit current and the actual current.

In an embodiment, the present application further provides a bus control device, including: an acquisition module, a limit current determination module, a deviation value determination module, a target requested torque determination module, and a bus current determination module.

The acquisition module is configured to obtain a data set including a motor speed, an actual current and an actual torque corresponding to a current time point;

The limit current determination module is configured to determine a limit current at the current time point according to the motor speed;

The deviation value determination module is configured to determine a deviation value at the current time point according to the limit current and the actual current in response to the limit current being less than the actual current;

The target requested torque determination module is configured to determine a target requested torque based on the deviation value and the actual torque; and The bus current determination module is configured to determine the bus current according to the target requested torque.

In an embodiment, the present application further provides a control system, including: a connected motor, a bus, a speed acquisition device, a torque acquisition device and a processor.

the speed acquisition device is configured to collect a motor speed at a current time point, and send the motor speed to the processor;

the torque acquisition device is configured to collect an actual torque at the current time point, and send the actual torque to the processor; and the processor is configured to receive the motor speed sent by the speed acquisition device and the actual torque sent by the torque acquisition device; obtain an actual current at the current time point; determine a limit current at the current time point according to the motor speed; in response to the limit current being less than the actual current, determine a deviation value at the current time point according to the limit current and the actual current; determine a target requested torque based on the deviation value and the actual torque.

In an embodiment, the present application further provides a computer storage medium, at least one instruction or at least one section of program is stored on the computer storage medium, when the at least one instruction or the at least one section of program is loaded and executed by a processor, the above bus current control method is implemented.

By adopting the above technical solution, the bus current control method provided by the present application has the following beneficial effects.

In this application, a data set is obtained; the data set includes the motor speed, the actual current and the actual torque corresponding to the current time point. The limit current at the current time point is determined according to the motor speed. In response to the limit current being less than the actual current, determining the deviation value at the current time point according to the limit current and the actual current. The target requested torque is determined based on the deviation value and the actual torque; and the bus current is determined according to the target requested torque. Under such circumstances, the present application can dynamically adjust the limit current and the target requested torque, thereby limiting the bus current within a safe range, and avoiding the passive overcurrent protection in the related art, resulting in damage to the vehicle parts and high-voltage safety risks.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures may be obtained by those skilled in the art according to structures in these drawings without creative works.

FIG. 4 is a flowchart of another bus current control method in the present application.

DETAILED DESCRIPTION OF THE EMBODIMENTS

The technical solutions in the embodiments of the present application will be clearly and completely described below in conjunction with the drawings in the embodiments of the present application, and it is clear that the described embodiments are only some of the embodiments of the present application, and not all of them. Based on the embodiments in the present application, all other embodiments obtained by those skilled in the art fall within the scope of the present application without creative labor.

It should be noted that the terms “current” and “second” in the description and claims of the present application and the above drawings are used to distinguish similar objects, but not necessarily to describe a specific order or sequence. It is to be understood that the data so used are interchangeable under appropriate circumstances such that the embodiments of the application described herein can be practiced in sequences other than those illustrated or described herein. Furthermore, the terms “including” and “having”, as well as any variations thereof, are intended to cover a non-exclusive inclusion, for example, a process, a method, a system, a product or a server including a series of steps or elements is not necessarily limited to the expressly listed instead, may include other steps or elements not explicitly listed or inherent to the process, method, product or apparatus.

Figure 1:
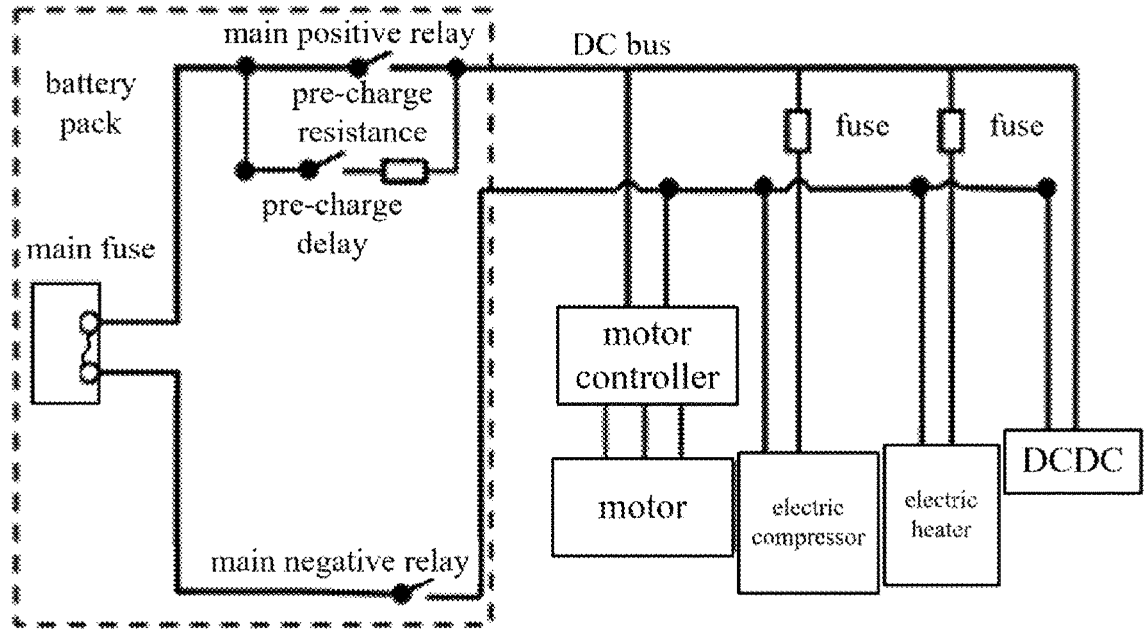
FIG. 1 is a structural diagram of a high-voltage power supply system of electric vehicle in the related art.
Figure 2:
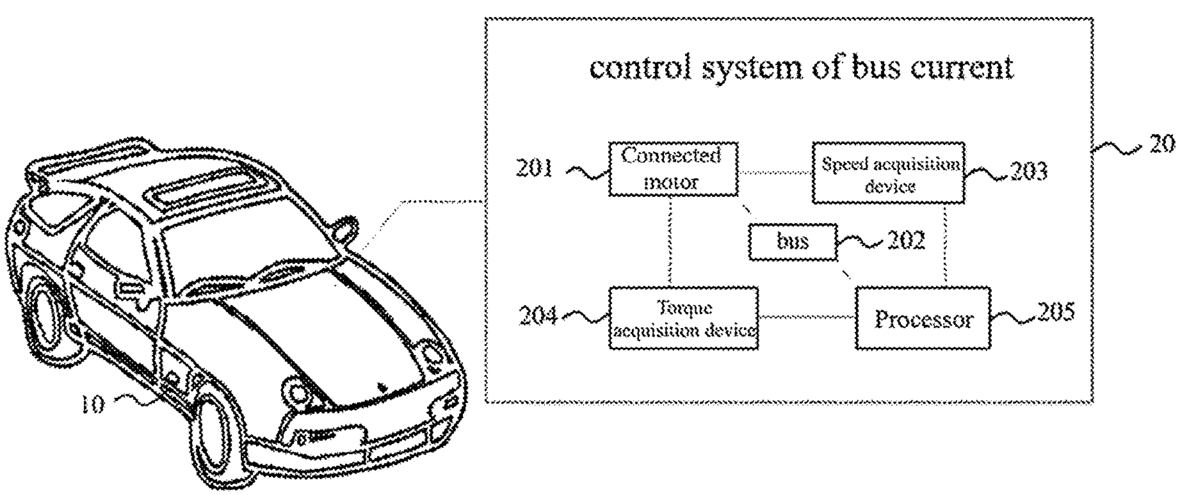
FIG. 2 is a schematic diagram of an application scenario provided by the present application.

As shown in FIG. 2, FIG. 2 is a schematic diagram of an application scenario provided by the present application. The scenarios include a vehicle 10 and a bus current control system 20 located therein. The bus current control system 20 includes a connected motor 201, a bus 202, a speed acquisition device 203, a torque acquisition device 204 and a processor 205; the speed acquisition device 203 is configured to collect the motor speed at the current time point, and send the motor speed to the processor 205; the torque acquisition device 204 is configured to collect the actual torque at the current time point, and send the actual torque to the processor 205. The processor 205 is configured to receive the motor speed sent by the speed acquisition device 203 and the actual torque sent by the torque acquisition device 204; obtain the actual current at the current time point; determine the limit current at the current time point according to the motor speed; in response to the limit current being less than the actual current, determine the deviation value at the current time point according to the limit current and the actual current; determine the target requested torque based on the deviation value and the actual torque.

In an embodiment, the speed acquisition device, the torque acquisition device and the processor may be communicated through a network, and the network may be a wireless network or a wired network.

In an embodiment, the processor may be a single-core or a multi-core processor.

Figure 3:
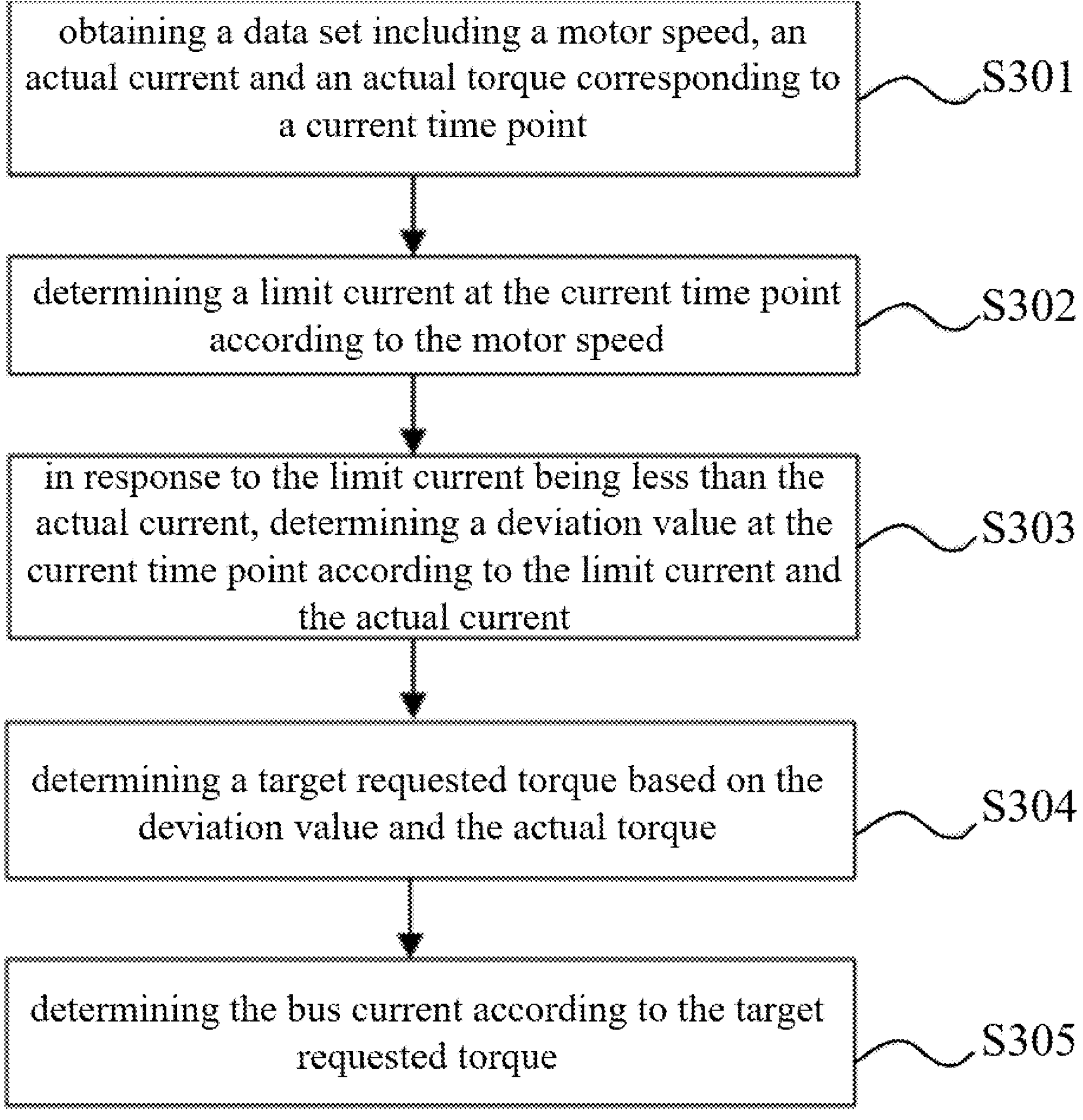
FIG. 3 is a flowchart of a bus current control method in the present application.

FIG. 3 is a flowchart of a bus current control method in the present application. The method steps such as the embodiment or the flowchart are provided in the description, but more or less steps may be included based on general or non-creative labor. The sequence of steps enumerated in the embodiments is only one of the execution sequences of many steps, and does not represent the only execution sequence. When an actual system or a server product is executed, the methods shown in the embodiments or drawings may be executed sequentially or in parallel (for example, in a parallel processor or multi-thread processing environment). As shown in FIG. 3, the method may include the following steps:

A bus current control method of the present application includes the following steps.

S301: obtaining a data set including a motor speed, an actual current and an actual torque corresponding to a current time point.

In an embodiment, the control method is applied to an electric vehicle, and the power source of the vehicle is a motor.

In an embodiment, the motor speed and the actual torque corresponding to the preset time point are collected based on the speed acquisition device and torque acquisition device, respectively.

In an embodiment, the control system further includes a current acquisition device to collect the actual current. The actual current refers to the actual current of the bus; the actual current may further be determined based on the motor speed, the actual torque, the bus voltage and the system efficiency, so that the vehicle cost can be reduced and the vehicle space can be increased. In an embodiment, the relationship between the above parameters may be expressed as the following formula.

$$I = \frac{Nr}{9.55\ U\eta}$$

N represents the actual torque; r represents the motor speed; U represents the bus voltage; and $\eta$ represents the system efficiency.

In an embodiment, the system efficiency may be determined by pre-calibration to the vehicle.

In an embodiment, the preset time point may be a preset time point with a fixed time interval between the adjacent preset time points. For example, the preset time point includes T1, T2, and T3, and the fixed time interval ΔT is 10 ms; then an interval between T1 and T2 and an interval between T2 and T3 are both 10 ms, so that the limit current at the current preset time point can be dynamically adjusted subsequently.

S302: determining a limit current at the current time point according to the motor speed.

Figure 4:
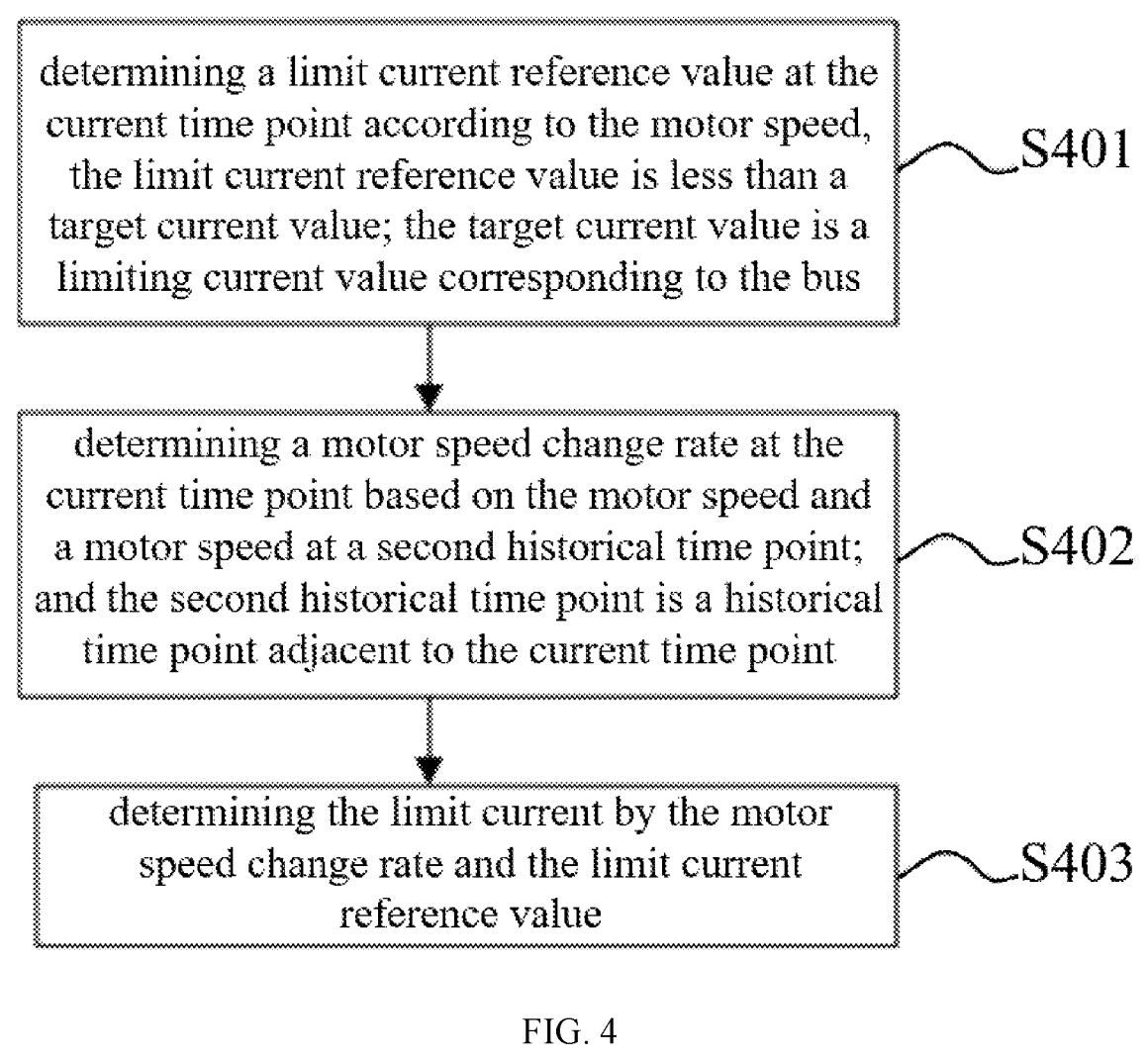

In order to improve the accuracy and efficiency of determining the limit current, as shown in FIG. 4, FIG. 4 is a flowchart of another bus current control method in the present application. Step S302 may include the following steps.

S401: determining a limit current reference value at the current time point according to the motor speed, the limit current reference value is less than a target current value; the target current value is a limiting current value corresponding to the bus.

Figure 5:
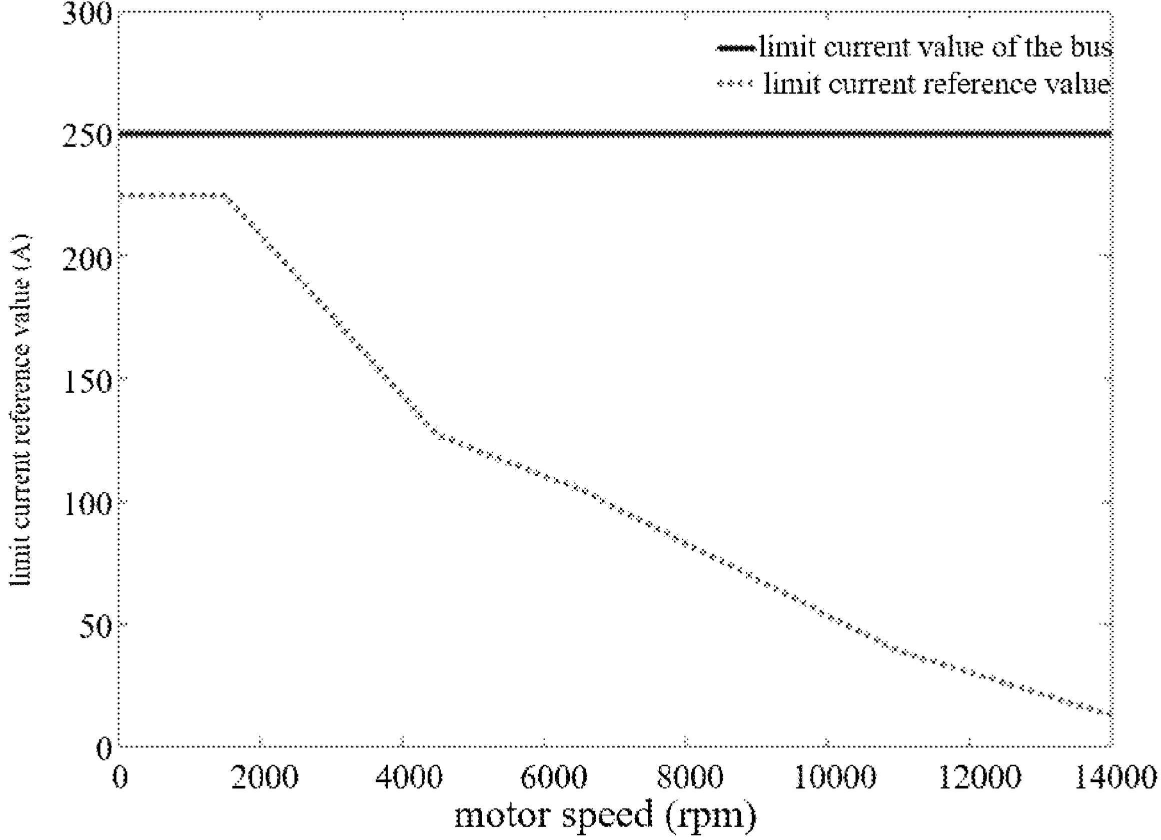
FIG. 5 is a relationship diagram of a limit current reference value and a motor speed of the present application.

In an embodiment, the limit current reference value can be determined by checking a first data table, the first data table is used to characterize the corresponding relationship between the motor speed and the limit current reference value, and the corresponding relationship between the motor speed and the limit current reference value can be analyzed and determined by collecting sample data, so that the limit current reference value set at the motor speed can make the subsequent requested torque be adjusted to the preset range within the preset time. As shown in FIG. 5, FIG. 5 is a relationship diagram of a limit current reference value and a motor speed of the present application. The motor speed and the limit current reference value have an inverse relationship, that is, the higher the motor speed, the lower the limit current reference value.

S402: determining a motor speed change rate at the current time point based on the motor speed and a motor speed at a second historical time point; and the second historical time point is a historical time point adjacent to the current time point.

In an embodiment, the motor speed change rate may be determined by the following formula:

$$\Delta r' = \frac{r(n) - r(n-1)}{\Delta T}$$

The Δr' represents the motor speed change rate at time n; the r(n) represents the motor speed at time n; the n represents the current time; the r(n−1) represents the motor speed at the time previous to time n; the ΔT represents the fixed time interval, and the ΔT satisfies the following formula: ΔT=T(n)−T(n−1). The T(n) represents the current preset time point; the T(n−1) represents a preset time point previous to the T(n).

In an embodiment, in order to make the rate of change of the motor obtained in this application more accurate, it is further necessary to perform a first-order filtering on the Δr'.

S403: determining the limit current by the motor speed change rate and the limit current reference value.

In an embodiment, in order to obtain the limit current at the preset time point in real time. Step 403 includes the following steps. determining a limit current correction value at the current preset time point based on the motor speed change rate at the current preset time point; determining the limit current at the current preset time point based on the limit current correction value and the limit current reference value.

Figure 6:
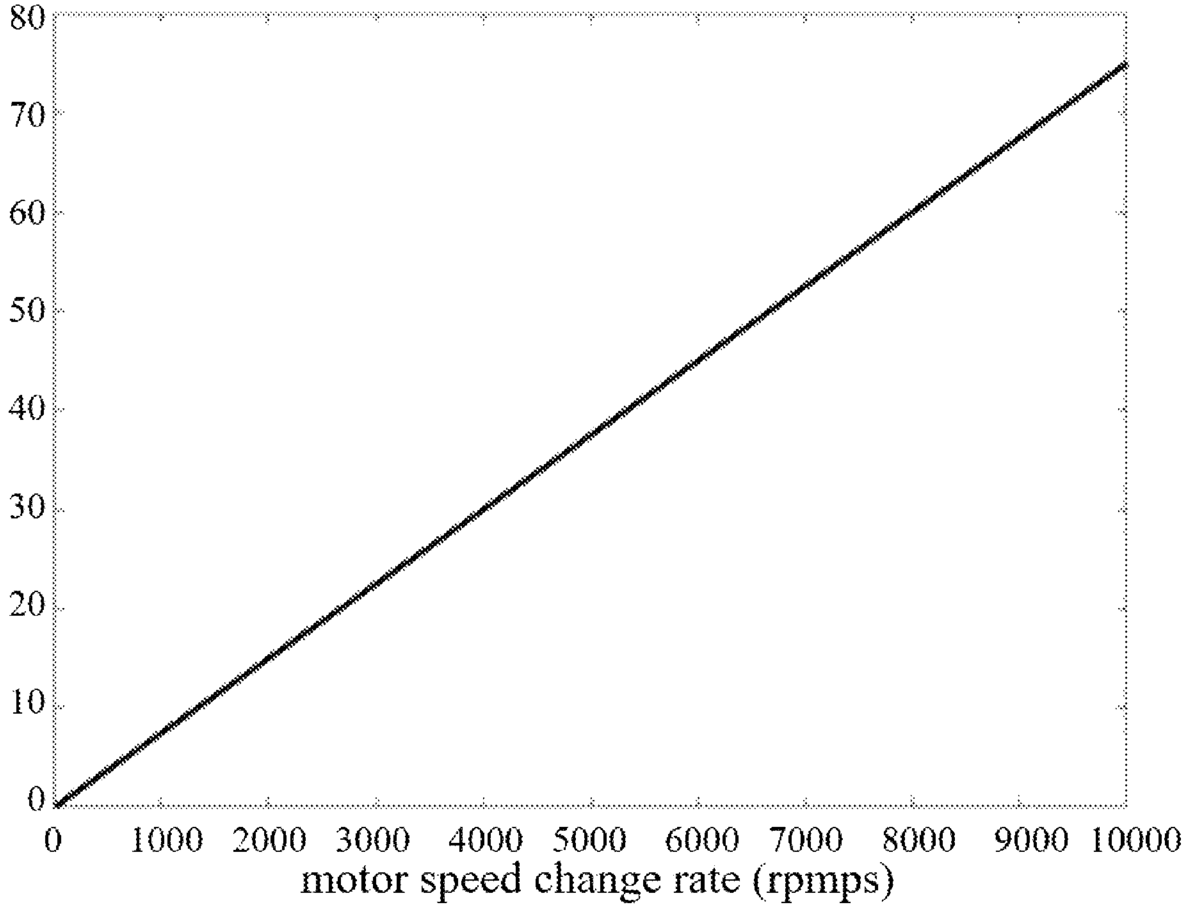
FIG. 6 is a schematic diagram of a relationship between a motor speed change rate and a limit current correction value in the present application.

In an embodiment, the limit current correction value can be obtained by checking a second data table used to characterize the corresponding relationship between the limit current correction value and the motor speed change rate. In an embodiment, as shown in FIG. 6, FIG. 6 is a schematic diagram of a relationship between the motor speed change rate and a limit current correction value in the present application. The greater the motor speed change rate, the greater the correction value of the limit current.

In an embodiment, the difference between the limit current reference value at the current preset time point minus the limit current correction value at the current preset time point can be determined as the limit current at the current preset time point, so that the limit current can be dynamically adjusted and determined based on the motor speed directly, and the limit current determined based on the above method is less than the maximum current value of the bus, which may further reasonably limit the bus current, and may further ensure that the requested torque corresponding to the current preset time point is the maximum allowable of.

S303: in response to the limit current being less than the actual current, determining a deviation value at the current time point according to the limit current and the actual current.

In an embodiment, the difference obtained by subtracting the limit current from the actual current may be directly determined as the deviation value; the deviation value may also be obtained by multiplying the difference obtained by subtracting the limit current from the actual current by a correction coefficient.

In an embodiment, in order to further ensure that the determined limit current will not cause the bus to overcurrent and thereby cause a circuit break. After step S302, the control method further includes: determining an updated limit current at the current preset time point based on the limit current at the current preset time point and a preset current value. In an embodiment, the difference obtained by subtracting preset current value from the limit current at the current preset time point may be determined as the updated limit current at the current preset time point.

Step S303 includes the following steps: in response to the updated limit current at the current preset time point being less than the actual current at the current preset time point, determining the deviation value at the current preset time point according to the updated limit current at the current preset time point and the actual current at the current preset time point.

S304: determining a target requested torque based on the deviation value and the actual torque.

Figure 7:
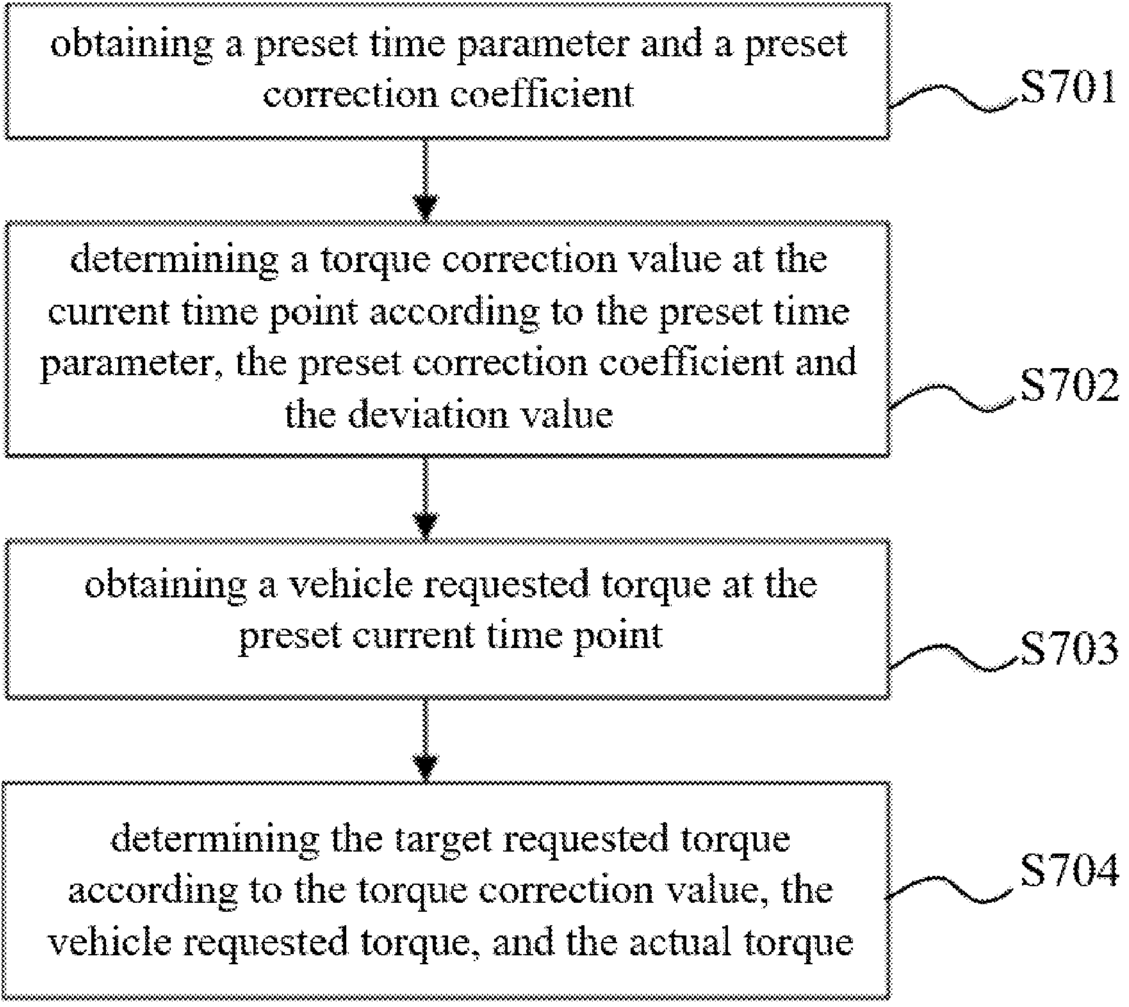
FIG. 7 is a flowchart of another bus current control method in the present application.
Figure 8:
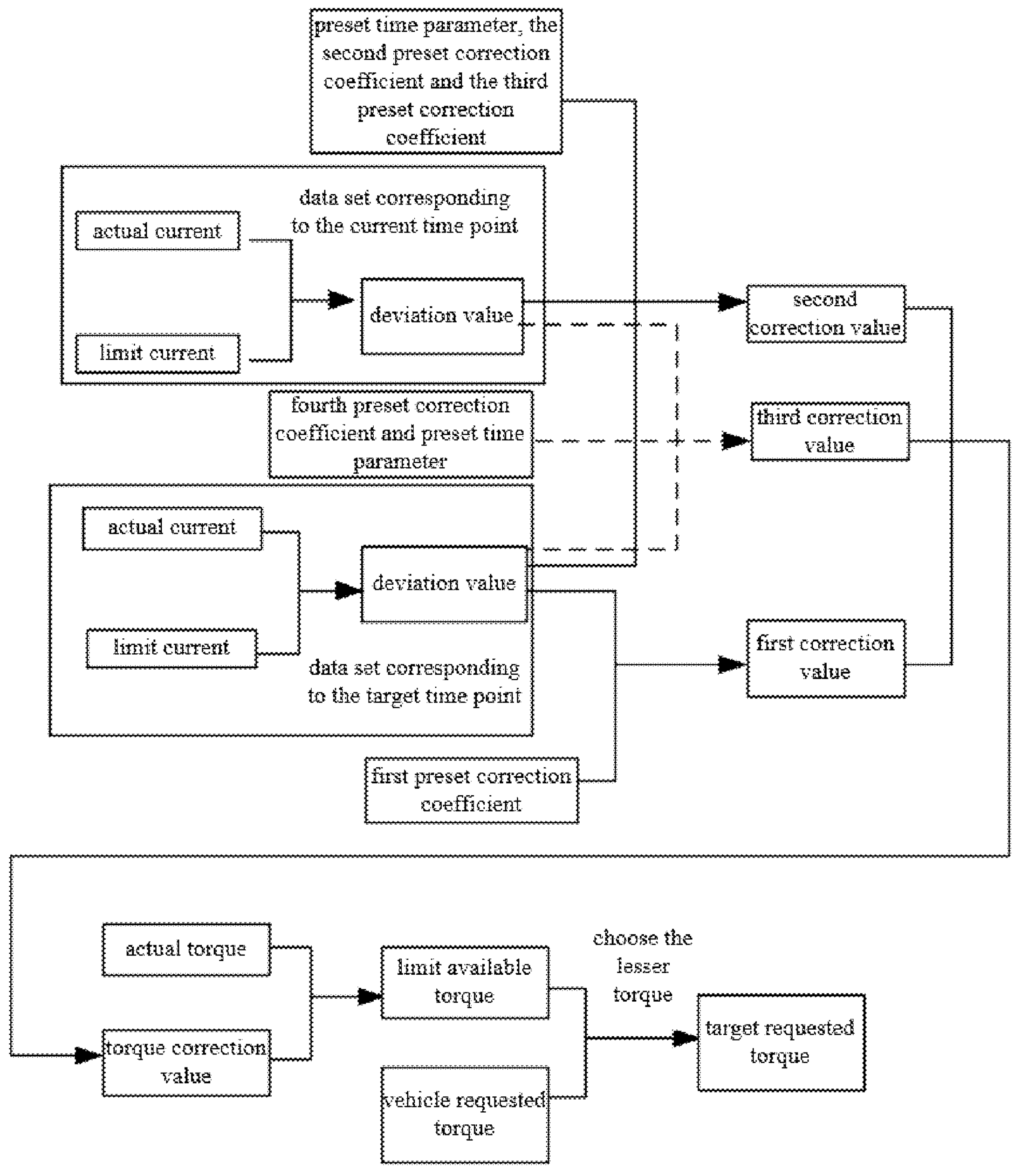
FIG. 8 is a schematic diagram of a process for determining a target requested torque in the present application.

In an embodiment, as shown in FIG. 7 and FIG. 8, FIG. 7 is a flowchart of another bus current control method in the present application. FIG. 8 is a schematic diagram of a process for determining a target requested torque in the present application. The above step S304 includes the following steps.

S701: obtaining a preset time parameter and a preset correction coefficient.

In an embodiment, the preset correction coefficient includes the preset correction coefficient includes a first preset correction coefficient, a second preset correction coefficient, a third preset correction coefficient and a fourth preset correction coefficient. These preset correction coefficients are used to adjust the following torque correction value, and then adjust the target requested torque to avoid overcurrent of the bus current.

In an embodiment, the preset time parameter is the fixed interval time. In an embodiment, the range of the preset time parameter is 0-5 s, and the preset time parameter is 10 ms, or 30 ms.

S702: determining a torque correction value at the current time point according to the preset time parameter, the preset correction coefficient and the deviation value.

Figure 9:
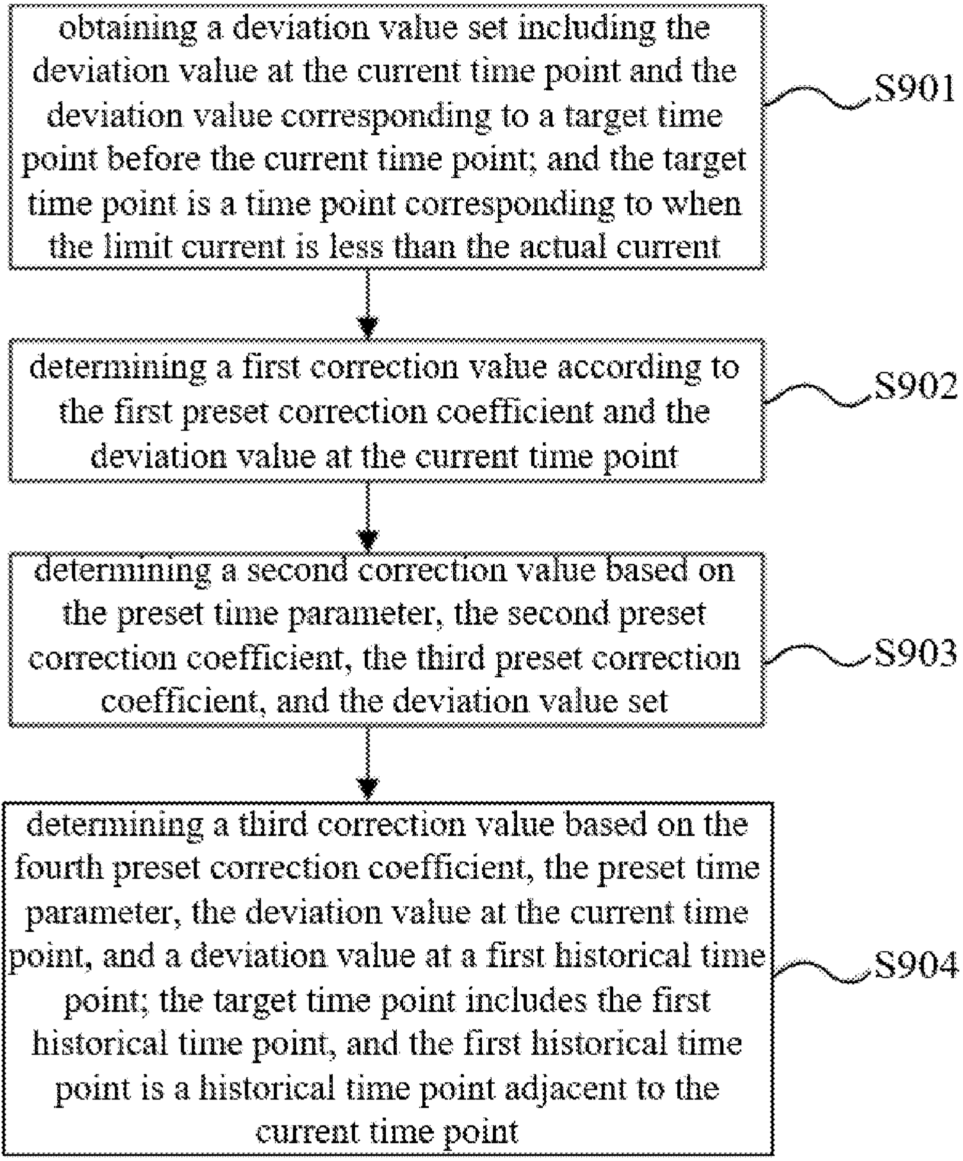
FIG. 9 is a flowchart of another bus current control method in the present application.

In an embodiment, as shown in FIG. 9, FIG. 9 is a flowchart of another bus current control method in the present application. Step S702 includes the following steps.

S901: obtaining a deviation value set including the deviation value at the current time point and the deviation value corresponding to a target time point before the current time point; and the target time point is a time point corresponding to when the limit current is less than the actual current.

In an embodiment, as shown in FIG. 8, the deviation data set includes a data set corresponding to the current time point and a data set corresponding to a target time point. The target time point is the time point corresponding to when the limit current is less than the actual current, and the target time point is the historical time point.

In an embodiment, the preset time points included in the deviation value set are T(n−3), T(n−2), T(n−1), T(n), T(n) is the current preset time point, T(n−3), T(n−2), and T(n−1) are the target preset time points previous to T(n) respectively. The deviation value corresponding to T(n) is recorded as E(n), then the deviation values corresponding to T(n−1), T(n−2), and T(n−3) are E(n−1), E(n−2), and E(n−3) respectively; then the sum of the deviation value is equal to E(n) plus E(n−1) plus E(n−2) plus E(n−3).

S902: determining a first correction value according to the first preset correction coefficient and the deviation value at the current time point.

In an embodiment, the first correction value is equal to the product of the first preset correction coefficient and the deviation value; and the first correction coefficient may be a preset fixed value or a variable value. The first preset correction coefficient can be used to determine the correspondence table between the deviation value and the first preset correction coefficient according to the historical data, so that the first preset correction coefficient corresponding to the current preset time point can be determined directly through table lookup. A fixed step size may also be set according to the needs, the first preset correction coefficient increases or decreases according to the fixed step size, for example: the preset time points include T1, T2, and T3, and the first preset correction coefficients corresponding to the preset time points are K1, K2, and K3 respectively; the distance between K1 and K2, and the distance between K2 and K3 are both m, which can improve the efficiency of adjusting the current below the limit current, ensure the smoothness of torque adjustment and improve the user's driving experience.

S903: determining a second correction value based on the preset time parameter, the second preset correction coefficient, the third preset correction coefficient, and the deviation value set.

In an embodiment, step S903 includes the following steps. Summing the deviation values at all preset time points in the deviation value set to obtain the sum of deviation values; determining the product of the sum of deviation values, the preset time parameter, the second preset correction coefficient and the third preset correction factor as the second correction value.

In an embodiment, in order to avoid that when the torque correction value is greater than the actual torque, the requested torque is continuous to be adjusted, and then an adjustment error is caused. In response to the actual torque at the first historical preset time point being greater than the torque correction value at the preset time point, the third preset correction coefficient is 1. In response to the actual torque at the first historical preset time point being less than or equal to the torque correction value at the first historical preset time point, the third preset correction coefficient is 0; thus, in response to the actual torque at the first historical preset time point being less than or equal to the torque correction value at the first historical preset time point, the third preset correction coefficient being set to 0.

S904: determining a third correction value based on the fourth preset correction coefficient, the preset time parameter, the deviation value at the current time point, and a deviation value at a first historical time point; the target time point includes the first historical time point, and the first historical time point is a historical time point adjacent to the current time point.

In an embodiment, the deviation value corresponding to the current preset time point is E(n), the deviation value of the first historical preset time point is E(n−1), and the preset time parameter is ΔT. In an embodiment, step S703 includes the following steps: determining the variation of the deviation value according to the preset time parameter, the deviation value at the current preset time point, and the deviation value of the first historical preset time point; and determining the third correction value based on the variation of the deviation value and the fourth preset correction coefficient. In an embodiment, the variation of the deviation value is equal to $[E(n)-E(n-1)]/\Delta T$; and the third correction coefficient is equal to the product of the variation of the deviation value and the fourth correction coefficient.

S904: determining the torque correction value at the current time point based on the first correction value, the second correction value and the third correction value.

In this embodiment, the first correction value, the second correction value and the third correction value are summed, and the sum value is determined as the torque correction value at the current preset time point.

It should be noted that the second correction coefficient and the fourth correction coefficient in this application are set in the same method as that of the first correction coefficient, and they can be fixed values or variable values according to needs. In the present application, the limit current and the actual current corresponding to the preset time point is continuously required to be determined, and once the limit current is less than the actual current, the requested torque needs to be adjusted until the limit current is greater than or equal to the actual torque.

Figure 10:
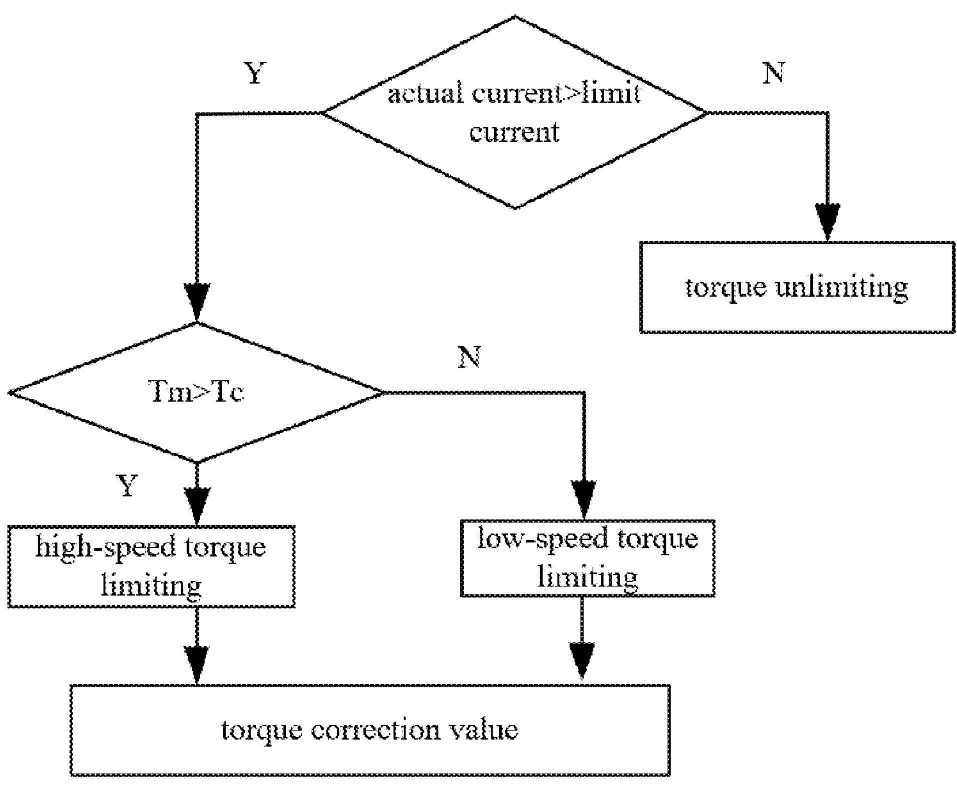
FIG. 10 is a flowchart of an adjustment for torque correction value of the present application.

When the current on the bus is overcurrent, it may not cause damage to the bus at that time. Only when the current overcurrent reaches a certain limit value and when enough heat is generated, the bus will be damaged. In order to further ensure the normal operation of the bus, it can also improve the smoothness of torque adjustment and improve the user's driving experience. In an embodiment, after the step S703, the control method further includes: obtaining the requested torque at the time point after the preset time interval; in response to the requested torque being greater than the preset requested torque, the torque correction value is increased by increasing one or more of the first correction coefficient, the second correction coefficient and the fourth correction coefficient, thereby adjusting the actual torque in a high power. The current is limited to the allowable limit range, thereby avoiding the further impact of the bus current and the occurrence of overcurrent. In an embodiment, as shown in FIG. 10, FIG. 10 is a flowchart of an adjustment for torque correction value of the present application. After the step S703, the control method further includes: in response to the current time being a first time, and the value Tm from the initial time to the first time being greater than the first preset value Tc, adjusting the torque correction value by using a high-speed torque limiter, thereby adjusting the target requested torque at a high speed. In response to the initial time being less than or equal to the set time, adjusting the torque correction value by using a low-speed torque limiter, thereby adjusting the target requested torque at a low speed, and further increasing the flexibility of the adjustment requested torque. The initial time is the time to turn on the limit current protection when the actual current is greater than the limit current. The first time is the time of adjusting to the first target requested torque, the first target requested torque may be the final target requested torque, and may also be the sub-target requested torque in the process of adjusting to the target requested torque. Subsequently, the above first time can also be used as the initial time, the second time is the time of adjusting to the second target torque, and the subsequent torque limiting speed is determined by determining whether the value of the initial time to the second time is greater than the second value.

It should be noted that, as can be seen from FIG. 10, in response to the actual current being less than or equal to the limit current, that is, the bus current at the current time point being within the allowable current range, there being no need to operate the torque limiting, In an embodiment, after the step S302, the control method further includes: in response to the limit current being greater than or equal to the actual current, obtaining a peak torque at the current time point and the vehicle requested torque at the current time point; determining the target requested torque according to the peak torque and the vehicle requested torque; and determining the bus current according to the target requested torque. In an embodiment, the minimum value of the peak torque and the vehicle requested torque may be directly determined as the target requested torque.

The above first preset value Tc may be calibrated according to the actual system, and the implementation of low-speed torque limitation is to consider that there is a certain margin in the design of the limit current. Within the margin, the overshoot of the actual current value is further limited by low-speed torque lowering, and the current limiting protection is realized. In response to the timing exceeding the first preset value Tc, implementing a high-speed torque limitation. Since it is considered that in the stage of low-speed torque limitation, the excess part of the energy impact generated by the overshoot current within the Tc time=the square of the current deviation multiplied by Tc, which is large, and in order to avoid further impact, the current needs to be quickly limited to the allowable limit range.

S703: obtaining a vehicle requested torque at the preset current time point.

S704: determining the target requested torque according to the torque correction value, the vehicle requested torque, and the actual torque.

In an embodiment, step S704 includes the following steps: determining the limit available torque based on the torque correction value at the current preset time point and the actual torque at the current preset time point; and determining the target requested torque according to the limit available torque and the vehicle requested torque.

Figure 11:
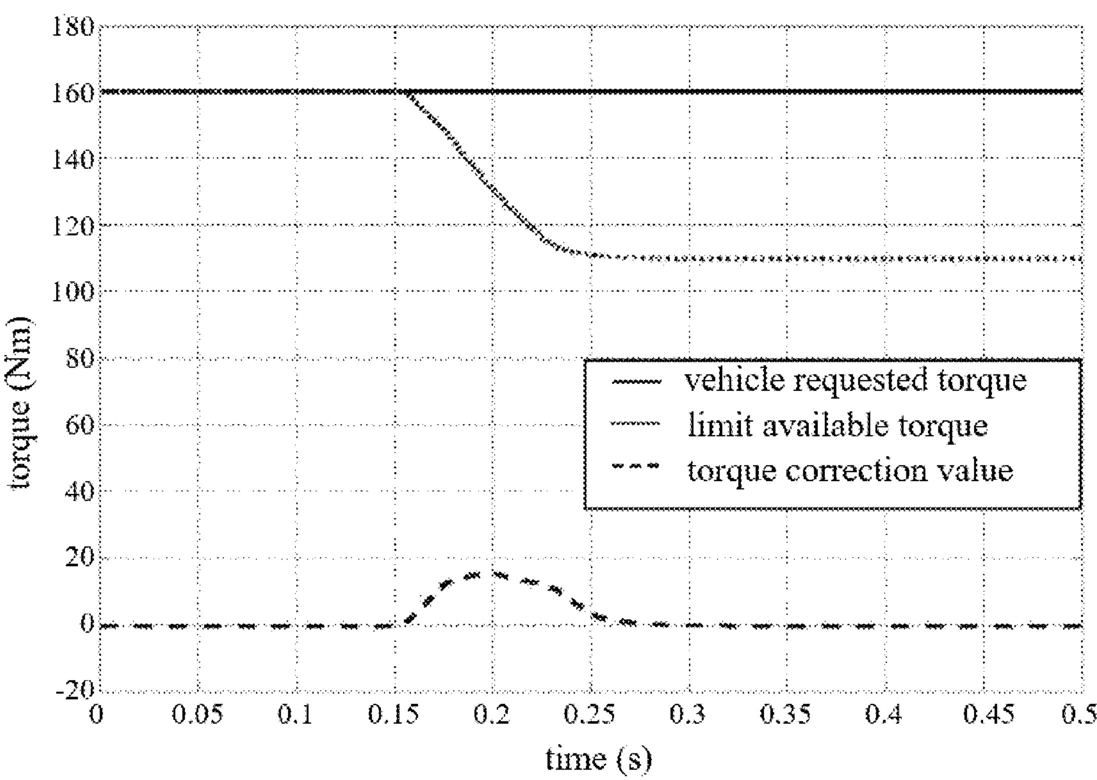
FIG. 11 is a graph showing a curve change of a requested torque of a vehicle, a limit available torque and the torque correction value over time in a dynamic adjustment process of the present application.

In an embodiment, as shown in FIG. 11, FIG. 11 is a graph showing a curve change of a requested torque of a vehicle, a limit available torque and the torque correction value over time in a dynamic adjustment process of the present application. In an embodiment, the difference obtained by subtracting the torque correction value from the actual torque may be determined as the limit available torque; the vehicle requested torque is a constant value, and the minimum value of the limit available torque and the vehicle requested torque is determined as the target requested torque; so as to further ensure that the current is limited within the allowable range. In response to the torque correction value being greater than zero, the limit available torque is gradually decreased until the torque correction value is equal to zero, and the limit available torque is a stable value.

S305: determining the bus current according to the target requested torque.

Figure 12:
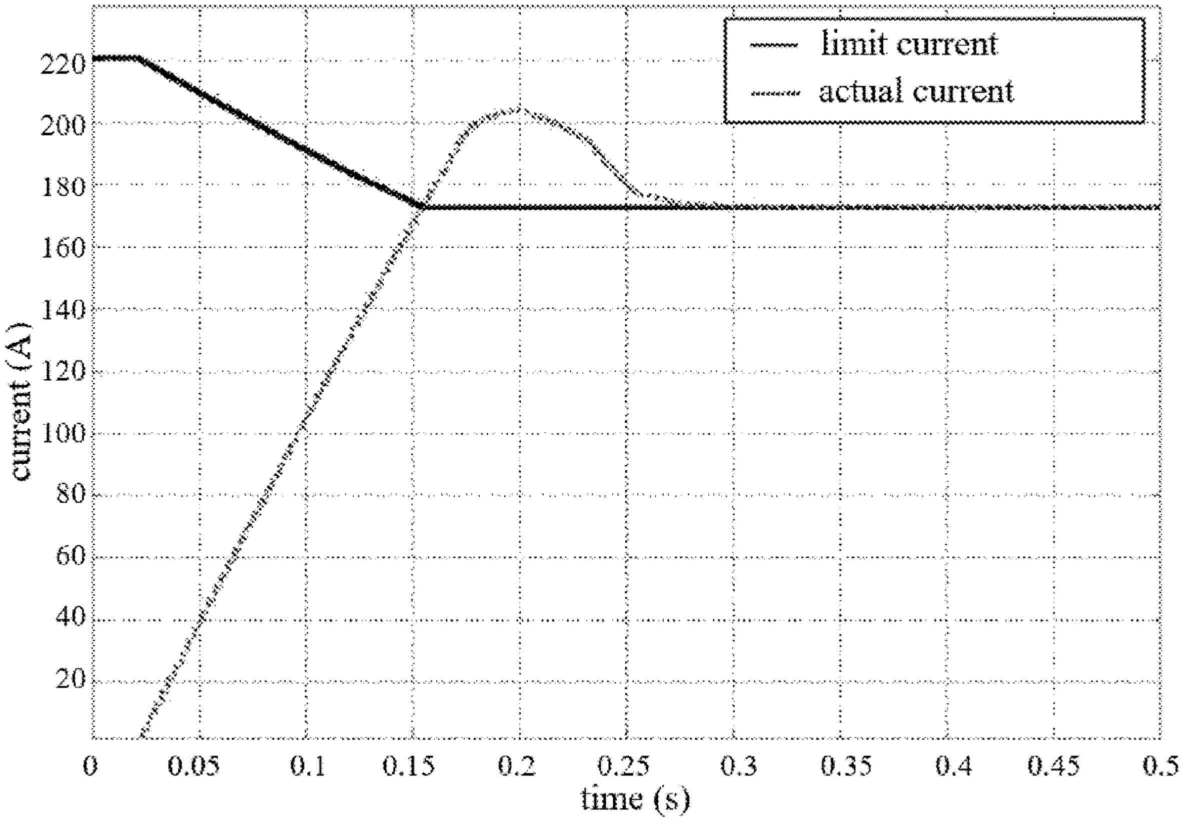
FIG. 12 is a graph showing a change of bus current over time in the dynamic adjustment process of the present application.

In an embodiment, as shown in FIG. 12, FIG. 12 is a graph showing a change of bus current over time in the dynamic adjustment process of the present application. In response to the actual current value being excessive, the control method of the bus current based on the present application actively limiting the requested torque to limit the further overshoot of the current. Accordingly, the overshoot of the actual current is effectively controlled to avoid exceeding the limit current.

To sum up, in the bus current control method provided by the present application, the motor speed is obtained in real time, the actual current at the current preset time point is determined through estimation, the motor speed is used to determine the limit current, and the limit current at the current preset time point is compared with the actual current. If the limit current is greater than or equal to the actual current, it means that the current bus current is lower than the limit current thereof, and there is no need to adjust the current torque. Otherwise, it is necessary to dynamically adjust the requested torque continuously until the limit current at the preset time point is greater than or equal to the actual current, the bus current can be continuously adjusted through the above-mentioned method of smoothly and dynamically adjusting the requested torque. Accordingly, the overcurrent of the bus current is avoided, the driving smoothness of the vehicle during the adjustment process is effectively ensured, and the driving comfort is improved.

Figure 13:
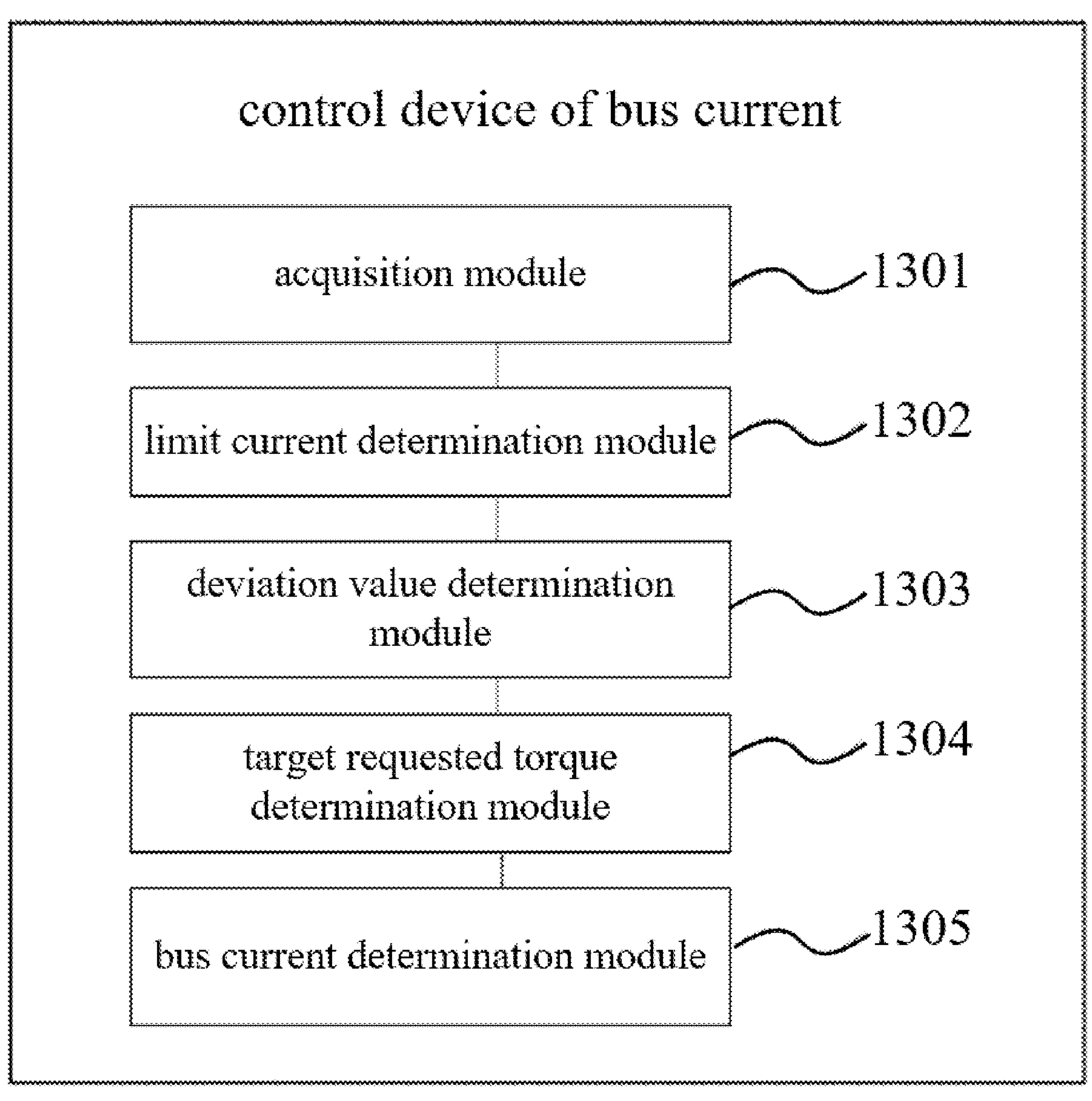
FIG. 13 is a schematic structural diagram of a current control device of the present application.

As shown in FIG. 13, FIG. 13 is a schematic structural diagram of a current control device of the present application. In an embodiment, the present application further provides a bus current control device including: an acquisition module, a limit current determination module, a deviation value determination module, a target requested torque determination module, and a bus current determination module.

The acquisition module 1301 is configured to obtain a data set including a motor speed, an actual current and an actual torque corresponding to a current time point.

The limit current determination module 1302 is configured to determine a limit current at the current time point according to the motor speed.

The deviation value determination module 1303 is configured to determine a deviation value at the current time point according to the limit current and the actual current in response to the limit current being less than the actual current.

The target requested torque determination module 1304 is configured to determine a target requested torque based on the deviation value and the actual torque.

The bus current determination module 1305 is configured to determine the bus current according to the target requested torque.

In an embodiment, the determining a target requested torque based on the deviation value and the actual torque includes the following.

The acquisition module is configured to obtain the preset time parameter and the preset correction coefficient.

The target requested torque determination module is configured to determine the torque correction value at the current time point according to the preset time parameter, the preset correction coefficient and the deviation value; obtain the vehicle requested torque at the current time point; and determine the target requested torque according to the torque correction value, the vehicle requested torque, and the actual torque.

In an embodiment, the preset correction coefficient includes a first preset correction coefficient, a second preset correction coefficient, a third preset correction coefficient and a fourth preset correction coefficient.

The control device includes a target requested torque determination module.

The target requested torque determination module is configured to obtain a deviation value set including the deviation value at the current time point and the deviation value corresponding to a target time point before the current time point; the target time point is a time point corresponding to when the limit current is less than the actual current; determine a first correction value according to the first preset correction coefficient and the deviation value at the current time point; determine a second correction value based on the preset time parameter, the second preset correction coefficient, the third preset correction coefficient, and the deviation value set.

The target requested torque determination module is further configured to determine the third correction value based on the fourth preset correction coefficient, the preset time parameter, the deviation value at the current time point, and a deviation value at a first historical time point; the target time point includes the first historical time point, and the first historical time point is a historical time point adjacent to the current time point; and determine the torque correction value at the current time point based on the first correction value, the second correction value and the third correction value.

In an embodiment, in response to the actual torque at the first historical time point being greater than the torque correction value at the first historical time point, the third preset correction coefficient is 1; and in response to the actual torque at the first historical time point being less than or equal to the torque correction value at the first historical time point, the third preset correction coefficient is 0.

In an embodiment, the device includes a target requested torque determination module.

The target requested torque determination module is configured to, in response to the limit current being greater than or equal to the actual current, obtain a peak torque at the current time point and the vehicle requested torque at the current time point; determine the target requested torque according to the peak torque and the vehicle requested torque; and determine the bus current according to the target requested torque.

In an embodiment, the device includes a limit current determination module.

The limit current determination module is configured to determine a limit current reference value at the current time point according to the motor speed, the limit current reference value is less than a target current value; the target current value is a limiting current value corresponding to the bus; determine a motor speed change rate at the current time point based on the motor speed and a motor speed at a second historical time point; the second historical time point is a historical time point adjacent to the current time point; and determine the limit current by the motor speed change rate and the limit current reference value.

In an embodiment, the control device further includes the limit current determination module, and a deviation value determination module.

The limit current determination module is configured to determine an updated limit current at the current time point based on the limit current and the preset current value.

The deviation value determination module is configured to, in response to the updated limit current being less than the actual current, determine the deviation value at the current time point according to the updated limit current and the actual current.

In an embodiment, the present application further provides a computer storage medium, at least one instruction or at least one program is stored on the computer storage medium, when the at least one instruction or the at least one section of program is loaded and executed by a processor, the above-mentioned bus current control method is implemented.

The embodiment of the present application also provides a storage medium, which can be provided in the server to save at least one instruction, at least one program, code set or instruction set, the at least one instruction, the at least one program, the code set or the instruction set are loaded and executed by the processor to implement the above bus current control method.

In an embodiment, in this embodiment, the storage medium may be located in at least one network server among multiple network servers of the computer network. In an embodiment, the above-mentioned storage medium may include but not limited to: U disk, read-only memory (ROM), random access memory (RAM), mobile hard disk, magnetic disk or optical disk and other media that can store program code.

The present application provides a bus current control method, a device, a system and a storage medium. In the control method of the present application, a data set is obtained; the data set includes the motor speed, the actual current and the actual torque corresponding to the current time point. The limit current at the current time point is determined according to the motor speed. In response to the limit current being less than the actual current, determining the deviation value at the current time point according to the limit current and the actual current. The target requested torque is determined based on the deviation value and the actual torque; and the bus current is determined according to the target requested torque. Under such circumstances, the present application can dynamically adjust the limit current and the target requested torque, thereby limiting the bus current within a safe range, and avoiding the passive over-current protection in the related art, resulting in damage to the vehicle parts and high-voltage safety risks.

It should be noted that: the order of the above-mentioned embodiments of the present application is only for description, and does not represent the advantages and disadvantages of the embodiments. And the above describes the specific embodiments of this specification. Other implementations are within the scope of the claims. In some cases, the actions or steps recited in the claims can be performed in an order different from that in the embodiments and still achieve desirable results. In addition, the processes depicted in the accompanying figures do not necessarily require the particular order shown, or sequential order, to achieve desirable results. Multitasking and parallel processing are also possible or may be advantageous in certain embodiments.

Each embodiment in this specification is described in a progressive manner, the same and similar parts of each embodiment can be referred to each other, and each embodiment focuses on the differences from other embodiments. In particular, for the device embodiment, since it is basically similar to the method embodiment, the description is relatively simple, and for relevant parts, please refer to part of the description of the method embodiment.

Those of ordinary skill in the art can understand that all or part of the steps for implementing the above embodiments can be completed by hardware, and can also be completed by instructing related hardware through a program. The program can be stored in a computer-readable storage medium. The above-mentioned storage medium may be a read-only memory, a magnetic disk or an optical disk, etc.

The above are only some embodiments of the present application, and do not limit the scope of the present application thereto. Under the spirit and the concept of the present application, any modifications, equivalent substitutions and improvements made are included in the scope of the present application.

What is claimed is:

1. A bus current control method, comprising:

obtaining a data set comprising a motor speed, an actual current and an actual torque corresponding to a current time point;

determining a limit current at the current time point according to the motor speed, wherein the determining the limit current at the current time point according to the motor speed comprises:

determining a limit current reference value at the current time point according to the motor speed, the limit current reference value being less than a target current value corresponding to a maximum allowable current of a bus;

determining a motor speed change rate at the current time point based on the motor speed and a motor speed at a second historical time point adjacent to the current time point; and determining the limit current based on the motor speed change rate and the limit current reference value;

determining an updated limit current at the current time point based on the limit current and a preset current value;

in response to the limit current or updated limit current being less than the actual current, determining a deviation value at the current time point according to the limit current or updated limit current and the actual current;

determining a target requested torque based on the deviation value and the actual torque, wherein the determining the target requested torque comprises:

determining a torque correction value at the current time point according to the deviation value, a preset time parameter, and at least one preset correction coefficient;

determining a limit available torque based on the actual torque and the torque correction value;

obtaining a vehicle requested torque at the current time point; and determining the target requested torque as a minimum of the limit available torque and the vehicle requested torque; and determining the bus current according to the target requested torque to limit an overcurrent of the bus.

2. The bus current control method according to claim 1, wherein the determining the target requested torque based on the deviation value and the actual torque comprises:

obtaining a preset time parameter and a preset correction coefficient;

determining a torque correction value at the current time point according to the preset time parameter, the preset correction coefficient and the deviation value;

obtaining a vehicle requested torque at the current time point; and determining the target requested torque according to the torque correction value, the vehicle requested torque, and the actual torque.

3. The bus current control method according to claim 2, wherein the preset correction coefficient comprises a first preset correction coefficient, a second preset correction coefficient, a third preset correction coefficient and a fourth preset correction coefficient;

the determining the torque correction value at the current time point according to the preset time parameter, the preset correction coefficient and the deviation value comprises:

obtaining a deviation value set comprising the deviation value at the current time point and the deviation value corresponding to a target time point before the current time point; wherein the target time point is a time point corresponding to when the limit current is less than the actual current;

determining a first correction value according to the first preset correction coefficient and the deviation value at the current time point;

determining a second correction value based on the preset time parameter, the second preset correction coefficient, the third preset correction coefficient, and the deviation value set;

determining a third correction value based on the fourth preset correction coefficient, the preset time parameter, the deviation value at the current time point, and a deviation value at a first historical time point; wherein the target time point comprises the first historical time point, and the first historical time point is a historical time point adjacent to the current time point; and determining the torque correction value at the current time point based on the first correction value, the second correction value and the third correction value.

4. The bus current control method according to claim 3, wherein:

in response to an actual torque at the first historical time point being greater than a torque correction value at the first historical time point, the third preset correction coefficient is set as 1;

in response to the actual torque at the first historical time point being less than or equal to a torque correction value at the first historical time point, the third preset correction coefficient is set as 0.

5. The bus current control method according to claim 1, wherein after the determining the limit current at the current time point according to the motor speed, the method further comprises:

in response to the limit current being greater than or equal to the actual current, obtaining a peak torque at the current time point and the vehicle requested torque at the current time point;

determining the target requested torque according to the peak torque and the vehicle requested torque; and determining the bus current according to the target requested torque.

6. A non-transitory computer storage medium storing at least one instruction or at least one section of program that, when loaded and executed by a processor, the bus current control method according to claim 1 is implemented.

* * * * *